(12) United States Patent
Jan et al.

(10) Patent No.: US 8,509,396 B2
(45) Date of Patent: Aug. 13, 2013

(54) AUTOMATIC CREATION OF COMPLEX CONVERSATIONAL NATURAL LANGUAGE CALL ROUTING SYSTEM FOR CALL CENTERS

(75) Inventors: Ea-Ee Jan, Ardsley, NY (US);
Hong-Kwang Jeff Kuo, Pleasantville, NY (US); David M. Lubensky, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 12/566,369

(22) Filed: Sep. 24, 2009

(65) Prior Publication Data

US 2011/0069822 A1 Mar. 24, 2011

(51) Int. Cl.
*H04M 1/64* (2006.01)

(52) U.S. Cl.
USPC ........................................ 379/88.03; 704/246

(58) Field of Classification Search
USPC .................. 379/88.01–88.04; 704/9, 246
See application file for complete search history.

(56) References Cited

U.S. PATENT DOCUMENTS

| | | | | |
|---|---|---|---|---|
| 5,884,249 | A * | 3/1999 | Namba et al. | 704/9 |
| 6,404,876 | B1 * | 6/2002 | Smith et al. | 379/218.01 |
| 6,556,671 | B1 * | 4/2003 | Beauvois | 379/265.02 |
| 6,839,671 | B2 * | 1/2005 | Attwater et al. | 704/255 |
| 7,197,460 | B1 * | 3/2007 | Gupta et al. | 704/270.1 |
| 7,248,678 | B2 * | 7/2007 | Adams et al. | 379/126 |
| 7,280,965 | B1 | 10/2007 | Begeja et al. | |
| 7,302,383 | B2 | 11/2007 | Valles | |
| 7,418,391 | B2 | 8/2008 | Gayama et al. | |
| 7,644,047 | B2 * | 1/2010 | Assadian et al. | 706/1 |
| 7,693,720 | B2 * | 4/2010 | Kennewick et al. | 704/275 |
| 7,822,612 | B1 * | 10/2010 | Goodheart | 704/275 |
| 8,165,887 | B2 * | 4/2012 | Tremblay | 704/275 |
| 2005/0147946 | A1 | 7/2005 | Ramamurthy et al. | |
| 2005/0165607 | A1 | 7/2005 | Di Fabbrizio et al. | |
| 2005/0221812 | A9 * | 10/2005 | Gailey et al. | 455/422.1 |
| 2006/0025995 | A1 | 2/2006 | Erhart et al. | |
| 2006/0045241 | A1 | 3/2006 | Bushey et al. | |
| 2006/0115070 | A1 * | 6/2006 | Bushey et al. | 379/265.02 |
| 2006/0149544 | A1 | 7/2006 | Hakkani-Tur et al. | |

(Continued)

OTHER PUBLICATIONS

Kiyota, "Dialog Navigator: A Navigation System from Vague Questions to Specific Answers based on Real-World Text Collections", pp. 1-136, retrieved Jul. 21, 2009 http://www.r.dl.itc.u-tokyo.ac.jp/~kiyota/paper/thesis/doctor.pdf.

Prati, "An Axiomatization of Fuzzy Classes", Stochatica XII-1, (1988), pp. 65-78.

Jan et al., "A framework for rapid development of conversational natural language call routing systems for call centers", Interspeech 2009, Brighton, England, pp. 1-4.

(Continued)

*Primary Examiner* — Simon Sing
(74) *Attorney, Agent, or Firm* — Yee & Associates, P.C.; Anne Dougherty (57) ABSTRACT

A call routing system is created by receiving a set of initial target classes and a corresponding set of topic descriptions. Non-overlapping semantic tokens in the set of topic descriptions are identified. A set of clear target classes from the non-overlapping semantic tokens and the initial target classes is identified. Overlapping semantic tokens from the set of topic descriptions are identified. A set of vague classes is identified from the overlapping semantic tokens and the initial target classes. A set of disambiguation dialogues and a set of grammar prompts is generated according to the overlapping and non-overlapping semantic tokens. The call routing system is then created based on the set of clear target classes, the set of vague target classes, and the set of disambiguation dialogues.

24 Claims, 6 Drawing Sheets

(56) References Cited

U.S. PATENT DOCUMENTS

| | | |
|---|---|---|
| 2006/0149555 A1 | 7/2006 | Fabbrizio et al. |
| 2008/0010280 A1 | 1/2008 | Jan et al. |
| 2008/0243505 A1 | 10/2008 | Barinov et al. |
| 2009/0037714 A1 | 2/2009 | DeWeerdt et al. |

OTHER PUBLICATIONS

Di Fabbrizio et al., Automated Wizard-of-Oz for Spoken Dialogue Systems', Interspeech 2005, Sep. 2005, Lisbon, Portugal, pp. 1857-1860.

* cited by examiner

FIG. 6 ium, device, or propagation medium. More specific examples (a
AUTOMATIC CREATION OF COMPLEX CONVERSATIONAL NATURAL LANGUAGE CALL ROUTING SYSTEM FOR CALL CENTERS

BACKGROUND

1. Field

The disclosure relates generally to a computer implemented method, a data processing system, and a computer implemented program code. More specifically, to a method of processing limited natural language data to automatically develop an optimal feature set, bypassing the standard Wizard of OZ (WOZ) approach is provided. The method provides for building natural language understanding models, or for processing existing data from other domains, such as the Internet, for domain-specific adaptation using maximum length semantic tokens. Consequently, when the optimal maximum length semantic tokens are passed to an engine, the maximum length semantic tokens produce robust models that can be used for natural language call routing.

2. Description of the Related Art

Call centers are increasingly choosing to develop a natural language call routing solution to replace a traditional tree-structure based touch-tone interactive voice response (IVR) application when the application contains a large number of menu options. Natural language call routing refers to applications that have an initial open-ended prompt where users are not directed in terms of what they can or cannot say. The typical example of this opening prompt is as, "Hi, I am an automated assistant here to direct your call. How may I help you?" In response to the prompt, users may freely describe their requests in their own words. This approach provides a natural human-machine interaction and reduces the burden on users to go through a lengthy tree structure of menu options, especially if the menu options contain over a hundred choices.

The design and development of a natural language call routing system ideally involves a number of different individuals, all contributing to the call routing system. User interface experts, business metric experts, speech scientists and domain experts all collaborate to create a systematic procedure for defining classes, collecting data through Wizard of Oz, writing specifications of how to label the data, and hiring and supervising user interface experts to label the data.

To design and develop a call routing system, the following three steps are involved: 1.) Design the classification classes, including clear and vague target classes; 2.) Develop disambiguation module including a prompt and disambiguation grammar for each vague target class; and 3.) Develop language and call routing model. However, in practice, call center operators are often unwilling to invest in this laborious and expensive process. It is not unusual that a call center operator would provide a page or two describing the types of routing targets desired, and expect the engineer to build an initial system based solely on the short specification.

Classes including clear and vague classes are first defined while designing the natural language call routing systems. Clear target classes are typically the terminal nodes of the tree describing the menu options of the interactive voice response system. They are commonly given by business requirements. A vague target class is associated with multiple clear target classes. It can be, but is not limited to, the intermediate nodes in the menu tree of the interactive voice response system. Vague target classes are artificial classes from overlap of clear targets in semantic space. They are commonly designed and maintained by the business analyst, Voice User Interface (VUI) designer, and speech scientist.

Excluding empty and all classes, in theory, if there are n clear target classes, the maximum number of possible vague target classes is given by equation 1:

$$2^n - n - 2. \qquad \text{Equation 1}$$

SUMMARY

According to one embodiment of the present invention, a call routing system is created by receiving a set of initial target classes and a corresponding set of topic descriptions. Non-overlapping semantic tokens in the set of topic descriptions are identified. A set of clear target classes from the non-overlapping semantic tokens and the initial target classes is identified. Overlapping semantic tokens from the set of topic descriptions are identified. A set of vague classes is identified from the overlapping semantic tokens and the initial target classes. A set of disambiguation dialogues and a set of grammar prompts is generated according to the non-overlapping semantic tokens. The call routing system is then created based on the set of clear target classes, the set of vague target classes, and the set of disambiguation dialogues.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
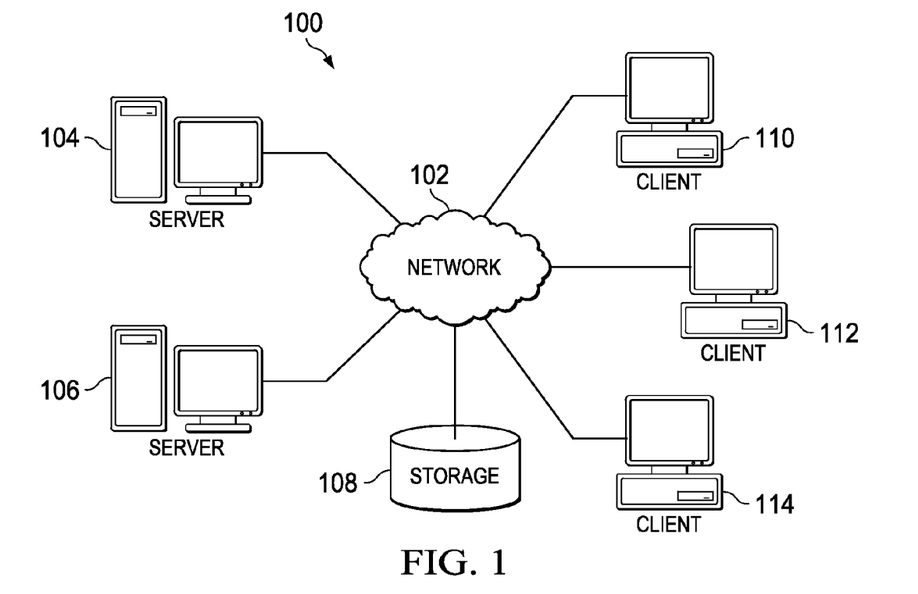
FIG. 1 depicts a pictorial representation of a network of data processing systems in which illustrative embodiments may be implemented.
Figure 2:
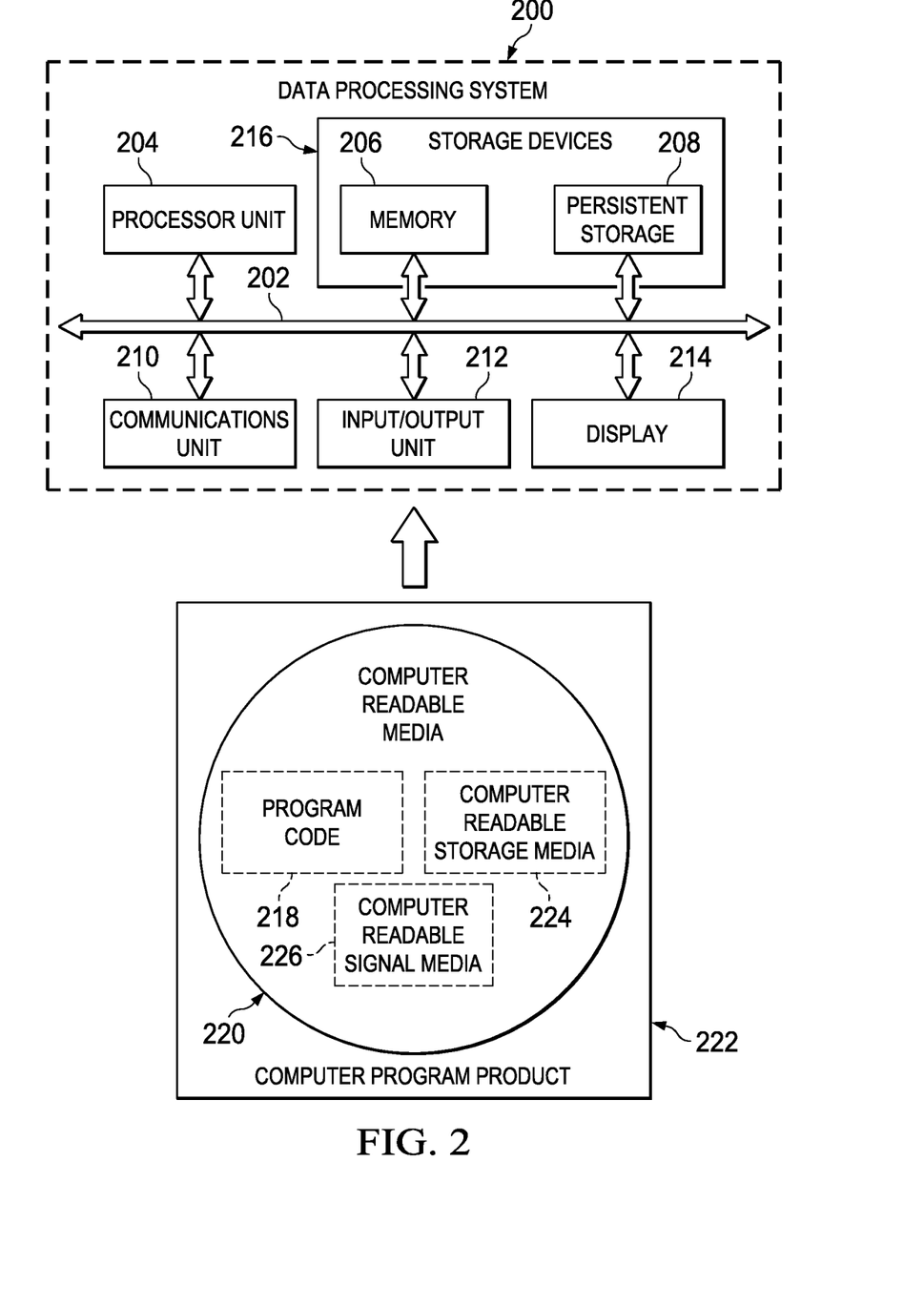
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein recognize that to design and maintain target classes within a call routing center is not a trivial effort. If the business requirements change, vague target classes have to be redesigned. When the system has m clear targets and n vague target classes, all n+m, classes need to be revisited when one clearer target is added. An automatic or semi-automatic process to update vague target classes is clearly desirable. When a new vague class is added, the associated disambiguation model, grammar and prompt, need to be added to support this new vague class. When the classes are changed, the natural language understanding model need to be updated to support the changes. An automatic or semi-automatic process to support the change will be highly appreciated.

The illustrative embodiments provide a call routing system created by receiving a set of initial target classes and a corresponding set of topic descriptions. Non-overlapping semantic tokens in the set of topic descriptions are identified. A set of clear target classes from the non-overlapping semantic tokens and the initial target classes is identified. Overlapping semantic tokens from the set of topic descriptions are identified. A set of vague classes is identified from the overlapping semantic tokens and the initial target classes. A set of disambiguation dialogues and a set of grammar prompts is generated according to the overlapping and non-overlapping semantic tokens. The call routing system is then created based on the set of clear target classes, the set of vague target classes, and the set of disambiguation dialogues.

Figure 3:
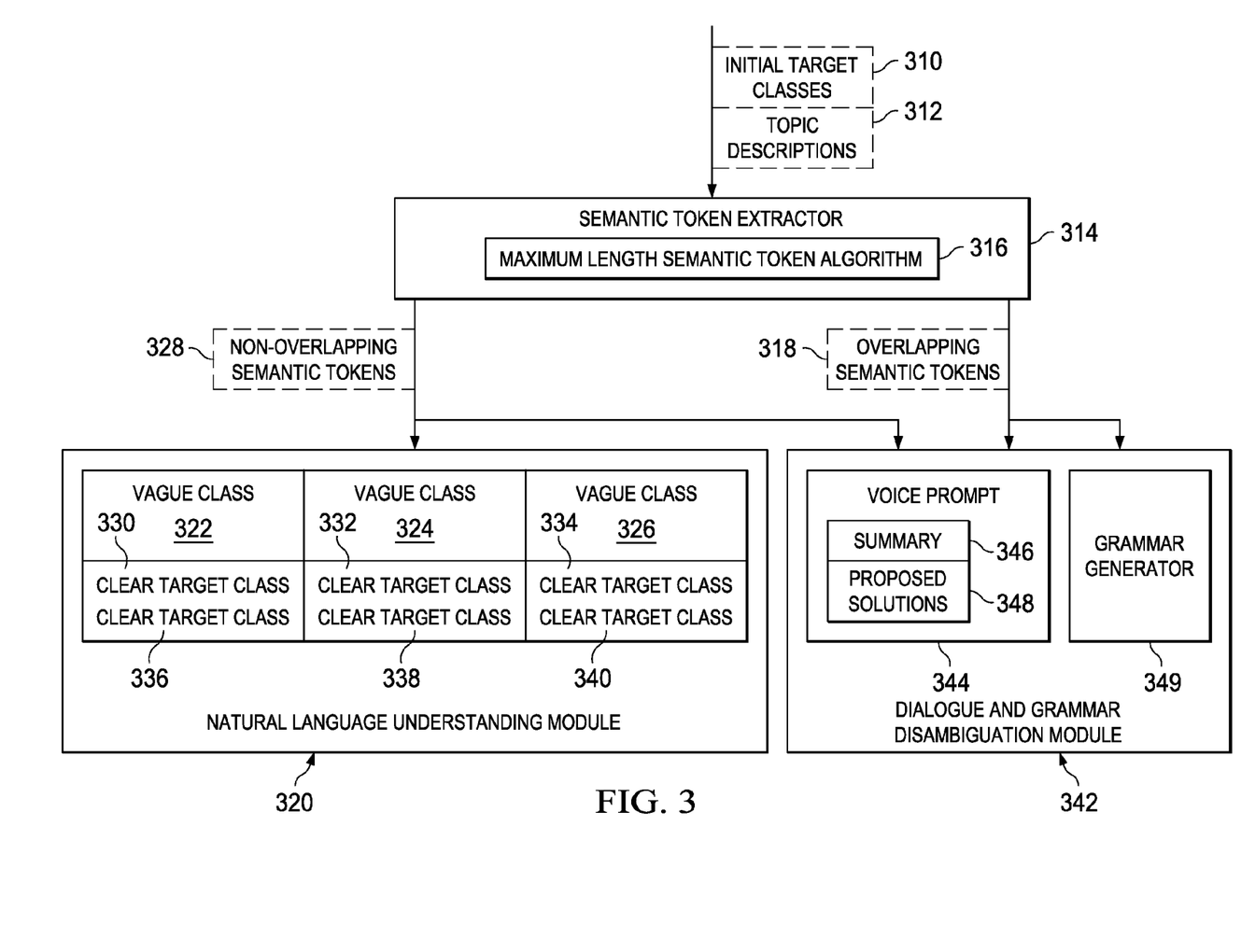
FIG. 3 is a dataflow for automatically creating a complex conversational language call routing system for call centers according to an illustrative embodiment.

Referring now to FIG. 3, a dataflow is shown for automatically creating a complex conversational language call routing system for call centers according to an illustrative embodiment. The dataflow of FIG. 3 is a dataflow between various software components that execute on a data processing system, such as data processing system 200 of FIG. 2.

A system administrator initially enters initial target classes 310 along with the corresponding topic descriptions 312 into maximum length semantic token extractor 314. Initial target classes 310 are typically the terminal nodes of a tree describing the menu options of the interactive voice response system. Initial target classes 310 are commonly given by business requirements. Each initial target classes 310 correspond to a final destination for routing a call within a call center.

Topic descriptions 312 briefly describe the semantic meaning of each of initial target classes 310 in the natural language call routing application. Topic descriptions 312 are generally one or two sentences describing the scope of the class. Topic descriptions 312 generally describe the business objective of initial target classes 310. Topic descriptions 312 may semantically overlap with others of topic descriptions 312.

Maximum length semantic token algorithm 316 identifies and extracts maximum length semantic tokens from each of topic descriptions 312. A semantic token is a key word or phrase that is important to the definition of one of clear target classes 310. Maximum length semantic token algorithm 316 can identify and extract the semantic tokens by different approaches, such as, but not limited to, a text processor that performs word stemming, combines words into phrases, and removes the filler or function words.

In one illustrative embodiment, the following example is used to explain the identification and extraction of maximum length semantic tokens from each of topic descriptions 312. In this illustrative example, a natural language call routing system is designed to support 6 frequently asked questions, including the following questions:

(Q1) How to unhide hidden columns for Excel 2002;
(Q2) How to unhide hidden rows for Excel 2002;
(Q3) How to remove password from Workbook for Excel 2000;
(Q4) How to create a password for Microsoft Windows;
(Q5) How to reset password for Linux operation system; and
(Q6) How to reset password for Lotus Notes.

Excel and Windows are registered trademarks of the Microsoft Corporation. Lotus Notes is a registered trademark of the Lotus Development Corporation. Linux is a registered trademark assigned to Mr. Linus Torvalds.

Each of the frequently asked questions Q1-Q6 corresponds to a clear target class, such as one of initial target classes 310. The sample semantic tokens for frequently asked questions Q1-Q6 include:

(Q1) Excel 2002 unhide hidden columns;
(Q2) Excel 2002 unhide hidden rows;
(Q3) Excel 2000 remove password workbook;
(Q4) create password Microsoft_windows;
(Q5) reset password Linux; and
(Q6) reset password Lotus Note.

Overlapping semantic tokens 318 are semantic tokens appearing in the definition of multiple clear target classes, such as multiple classes of initial target classes 310. Maximum length semantic token algorithm 316 and natural language understanding module 320 use overlapping semantic tokens 318 to identify vague classes, such as vague classes 322 and 324. Vague target classes are artificial classes from overlap of clear targets in semantic space.

In the example above, the semantic token "password" appears in the clear target classes defined by Q3, Q4, Q5, and Q6. Therefore, the semantic token "password" overlaps the clear target classes defined by Q3, Q4, Q5, and Q6, a vague class "password" is created.

In the above examples, four vague classes are created. The vague class of "excel" is a vague class defined by an overlap between Q1, Q2, and Q3. The vague class of "excel 2002 unhide hidden" is a vague class defined by an overlap between Q1 and Q2. The vague class "password" is a vague class defined by an overlap between Q3, Q4, Q5, and Q6. The vague class of "reset password" is a vague class defined by an overlap between Q5 and Q6.

In the illustrative example, note that "create password" is not a vague target, it refers to Q4 only. In the illustrative example, note that while the sequences of "excel 2002", "excel 2002 unhide" and "excel 2002 unhide hidden" refer to the same vague class which involve Q1 and Q2, only one vague class is defined. In an illustrative embodiment, only the longest set of semantic tokens common to multiple clear targets, referred as confusion set, is used to specify a vague class. Therefore, only the maximum length semantic token defines the confusion set, and the vague class generated therefrom. Thus "excel 2002 unhide hidden" defines the vague class that includes Q1 and Q2.

The illustrative embodiment in the described example uses 4-gram sequences to calculate vague classes to save resources. However, the illustrative embodiments are not limited to a 4-gram sequence. Depending on system resources and operator preferences, any n-gram sequence could be utilized.

Natural language understanding module 320 takes overlapping semantic tokens 318 and organizes them into a data structure containing the vague classes, such as vague classes 322 and 326, and the underlying clear target classes 330-340 that are members of the various vague classes. When converted speech input is input into natural language understanding module 320, natural language understanding module 320 determines whether to perform a disambiguation between various members of the vague class, or whether to route the call according to an identified clear target class.

Returning now to the maximum length semantic token algorithm 316, non-overlapping semantic tokens 328 are semantic tokens appearing in the definition of only one clear target class, such as one of initial target classes 310. Maximum length semantic token algorithm 316 and dialogue and grammar disambiguation module 342 use non-overlapping semantic tokens 328 to distinguish among clear target classes within a single vague class, such as vague classes 322 or 326.

In the above examples, four vague classes are created. The individual clear target classes among those four vague classes can be distinguished using non-overlapping semantic tokens 328 extracted from topic descriptions 312.

The vague class of "excel" is a vague class defined by an overlap between Q1, Q2, and Q3. The non-overlapping semantic tokens "2002," "unhide," "hidden," and "columns" distinguish Q1 from others members of the vague class. The non-overlapping semantic tokens "2002," "unhide," "hidden," and "rows" distinguish Q2 from others members of the vague class. The non-overlapping semantic tokens "remove," "password," "workbook" or a combination thereof, distinguish Q3 from others members of the vague class.

The vague class of "excel 2002 unhide hidden" is a vague class defined by an overlap between Q1 and Q2. The non-overlapping semantic token "columns" distinguishes Q1 from others members of the vague class. The non-overlapping semantic token "rows" distinguishes Q2 from others members of the vague class.

The vague class "password" is a vague class defined by an overlap between Q3, Q4, Q5, and Q6. The non-overlapping semantic tokens "excel," "2000," "remove," "workbook" or a combination thereof, distinguish Q3 from others members of the vague class. The non-overlapping semantic tokens "create," "Microsoft windows" distinguish Q4 from others members of the vague class. The non-overlapping semantic tokens "reset," and "Linux," distinguish Q5 from others members of the vague class. The non-overlapping semantic tokens "reset," and "Lotus Note" distinguish Q6 from others members of the vague class.

The vague class of "reset password" is a vague class defined by an overlap between Q5 and Q6. The non-overlapping semantic token "Linux," distinguishes Q5 from others members of the vague class. The non-overlapping semantic token "Lotus Note" distinguishes Q6 from others members of the vague class.

Dialogue and grammar disambiguation module 342 includes a prompt and a grammar for each vague class to guide the user to the final, clear target class. When a vague target involves a small number of clear targets, a simple directed dialogue module would be sufficient. However, in vague classes involving a large number of clear target classes, it is often too cumbersome to enumerate all the possible clear targets. The disambiguation process can therefore lead a user response through various subsets of the vague target before reaching the final clear target class.

Typically, voice prompt 344 of the dialogue and grammar disambiguation module 342 includes two parts. Summary 346 summarizes user intent from the preceding query. Proposed solutions 348 enumerates possible solutions to the user.

In one illustrative embodiment, and continuing with the example presented above, if the user says: "I forgot my password. I cannot login. Could you help me to reset my password?" This query is routed to the "reset password" vague class.

The system can reply "OK. You need help on password reset", "Do you need Linux password reset of Lotus Notes password reset". The "reset password" is the longest semantic tokens sequences to define this particular vague class. These overlapping semantic tokens, such as overlapping semantic tokens 318, can be used as features to generate the first part of the prompt. As a first pass prompt, a simple template approach, such as "OK. You need help on xxx", can be utilized to create voice prompt 344.

Maximum length signature semantic tokens are then used to generate the second parts of the prompts. The term "signature" refers to non-overlapping semantic tokens 328 extracted from topic description 312 that uniquely identify one of initial target classes 310. In one illustrative embodiment, and continuing with the example presented above, non-overlapping semantic tokens "Lotus Note" and "Linux" are signatures for Q6, Q5, respectively.

In one illustrative embodiment, and continuing with the example presented above, "remove," "workbook," "2000" and any combination of these three tokens are signature to Q3 for password vague. In one illustrative embodiment, a maximum length signature is used to create voice prompt 344 because the maximum length signature carries the most information.

A simple template method can also be used to generate the second part of the prompt. As another example, if the user says: "show me how to unhide excel" the query is mapped to the vague class of "excel 2002 unhide hidden". The Q1 and Q2 are clear targets associated to with this vague class. The signature "columns" distinguishes Q1 from others members of the vague class. The signature "rows" distinguishes Q2 from others members of the vague class. The prompt can be as simple as "OK, you need help on excel 2002 unhide hidden, do you need rows or columns?" A statistical prompt generation approach can be further explored using these features.

However, if the vague class leads to too many clear target classes, a voice response listing all the possible disambiguities between the vague class becomes too cumbersome. In one illustrative embodiment, and continuing with the example presented above, a user says: "I need help on my password." The statement is then mapped to the vague class "password," which contains four clear classes: Q3, Q4, Q5, and Q6. Different strategies have been used today for this scenario.

Instead of presenting another open-ended voice prompt dialogue and grammar disambiguation module 342 presents the user with a directed voice prompt leading to a maximum reduction of expected entropy of the vague classes. To achieve maximum reduction in clear target classes, the semantic tokens from all clear target classes that the vague class is associated with are collected. One or two semantic token sequences having a maximum length that separates the clear target classes into several subspaces with similar sizes are chosen as features to create the directed voice prompt.

In one illustrative embodiment, and continuing with the example presented above, for the vague class "password," the non-overlapping semantic tokens "password reset" can distinguish Q3, Q4, Q5 and Q6 into a first subspace of Q3 and Q4, and a second subspace of Q5 and Q6. Dialogue and grammar disambiguation module 342 can generate voice prompt 344 incorporating the non-overlapping semantic tokens "password reset" to distinguish Q3, Q4, Q5 and Q6 into subspaces.

The grammar for each of vague classes 322 and 326 is created via grammar generator 349 which uses the maximum length semantic token algorithm 316 by extracting non-overlapping semantic tokens 328 from topic descriptions 312. Topic descriptions 312 are used as the input data to maximum length semantic token algorithm 316. Maximum length semantic token algorithm 316 can then be improved by taking only the semantic tokens of topic description 312, rather than all words, to calculate unique signature and confusion set. By taking only the semantic tokens of topic description 312, the grammar is more concise with better performance in the call routing system.

The main body of the vague grammar associated with the vague class "password", which contains Q3, Q4, Q5 and Q6, is illustrated by Table 1. Natural language cues, such as "I need help on", "could you help me with" and "please", can be added upon this main body for better grammar coverage.

TABLE 1 disambiguous grammar for "password" vague class
<S> ::=
how? to? remove? password? from? workbook? for? microsoft excel? 2000 :Q3 |
how? to? remove? password? from? workbook? for? microsoft excel 2000? :Q3 |
how? to? remove password? from? workbook? for? microsoft excel? 2000? :Q3 |
how? to? remove? password? from? workbook for? microsoft excel? 2000? :Q3 |
how? to? create a? password? for? microsoft windows? :Q4 |
how? to? create? a? password? for? microsoft windows :Q4 |
how? to? reset? password? for? linux operation system? :Q5 |
how? to? reset? password? for? linux? operation system :Q5 |
how? to? reset? password? for? lotus notes :Q6 |
password :Q6::Q3::Q5::Q4 |
reset :Q6::Q5 |
something else :Q3::Q4 |
reset password :Q5::Q3 .

From Table 1, this vague grammar supports "reset" or "reset password", which leads a vague class containing the clear target classes of Q5 and Q6. "Something else" supports new vague class containing the clear target classes of Q3 and Q4. Prompts and grammars can be generated and interact with the user recursively until a clear class or maximum number of re-trials has been reached.

Figure 4:
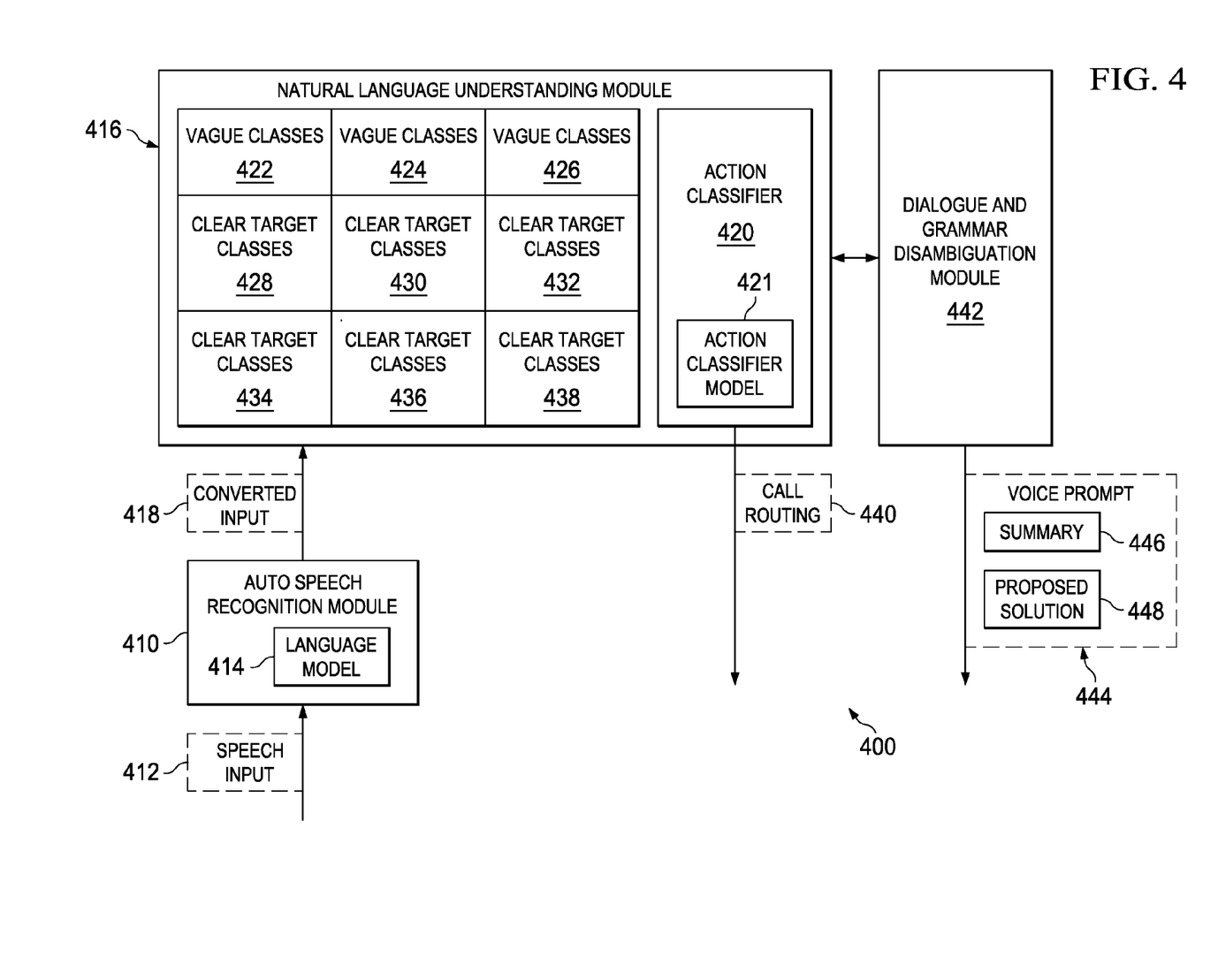
FIG. 4 is a dataflow for automatically routing calls using a complex conversational natural language call routing system for call centers according to an illustrative embodiment.

Referring now to FIG. 4, a dataflow for automatically routing calls using a complex conversational natural language call routing system for call centers is shown according to an illustrative embodiment. The complex conversational natural language call routing system of FIG. 4 is the complex conversational natural language call routing system generated according to the dataflow of FIG. 3.

When a user is connected to the call routing system, automatic speech recognition module 410 receives speech input 412 from the user. Automatic speech recognition module 410 is a software module that converts the spoken speech input 412 from the user into the text-based converted input. A statistical comparison of speech input 412 is performed in order to determine the probable text conversion. In one illustrative embodiment, speech input 412 is typically divided into frames, and each frame undergoes a short-time Fourier transformation, or other digital transformation, to create a spectral representation of the speech input. Characteristics of the transformed speech input 412 are isolated from each of the signal frames, and compared to statistical models of known subject matter and performers to determine similarities using known statistical classification methods, such as K-nearest neighbor, Gaussian mixture modeling, support vector machines, vector quantization, hidden Markov modeling, and multivariate auto-regression modeling. From those models, and in conjunction with language model 414, a probable text can be determined.

After the speech has been converted into a probable text, action classifier 420 models the probable text into queries understood by natural language understanding module 416. Natural language understanding module 416 is natural language understanding module 320 of FIG. 3. The queries are input into natural language understanding module 416 as converted input 418.

According to the queries identified in converted input 418, action classifier 420 then classifies converted input 418 into one of vague classes 422-426, or one of the underlying clear target classes 428-438, depending on the queries identified in converted input 418 and any matching semantic tokens within the database. Action classifier 420 classifies converted input 418 according to action classifier model 421. Vague classes 422-426 are vague classes 322-324 of FIG. 3. Clear target classes 428-438 are clear target classes 330-340 of FIG. 3. Action classifier 420 is a software component that matches converted input 418 to the most similar one of vague classes 422-426 or clear target classes 428-438 based on the overlap of the semantic tokens of vague classes 422-426, the semantic tokens of clear target classes 428-438, and the queries identified in converted input 418. Action classifier 420 classifies converted input 418 based on action classifier model 421. Action classifier model 421 is a statistically based classification scheme, that can utilize any statistical method, such as, but not limited to, K-nearest neighbor, Maximum Entropy classifier, Gaussian mixture modeling, support vector machines, vector quantization, hidden Markov modeling, and multivariate auto-regression modeling.

If a match is made to a clear target class, call routing 440 forwards the call to its destination. If a match is not made to a clear target class, but rather to a vague class, dialogue and grammar disambiguation module 442 forwards the appropriate voice prompt 444 to the user dialogue and grammar disambiguation module 442 in dialogue and grammar disambiguation module 342 of FIG. 3. The user can then respond to voice prompt 444, resulting in the selection of a clear target class, or a further reduction in the number of vague classes in which the call could be classified.

Dialogue and grammar disambiguation module 442 includes a prompt and grammar for each vague class to guide the user to the final, clear target class. When a vague target involves a small number of clear targets, a simple directed dialogue module would be sufficient. However, in vague classes involving a large number of clear target classes, it is often too cumbersome to enumerate all the possible clear targets. The disambiguation process can therefore lead a user response through various subsets of the vague target class before reaching the final clear target class.

Typically, voice prompt 444 of the dialogue and grammar disambiguation module 442 includes two parts. Summary 446 summarizes user intent from the preceding query. Proposed solution 448 enumerates possible solutions to the user.

In one illustrative embodiment, and continuing with the example presented above, if the user says: "I forgot my password. I cannot login. Could you help me to reset my password?" This query is routed to the "reset password" vague class.

Dialogue and grammar disambiguation module 442 can reply "OK. You need help on password reset", "Do you need Linux password reset of Lotus Notes password reset". The "reset password" is the longest semantic tokens sequences to define this particular vague class.

As another example, if the user says: "show me how to unhide excel" the query is mapped to the vague class of "excel 2002 unhide hidden". The Q1 and Q2 are clear targets associated with this vague class. The signature "columns" distinguishes Q1 from others members of the vague class. The signature "rows" distinguishes Q2 from others members of the vague class. The prompt can be as simple as "OK, you need help on excel 2002 unhide hidden, do you need rows or columns?" A statistical prompt generation approach can be further explored using these features.

However, if the vague class leads to too many clear target classes, a voice response listing all the possible disambiguities between of the vague class becomes too cumbersome. In one illustrative embodiment, and continuing with the example presented above, a user says: "I need help on my password." The statement is then mapped to the vague class "password," which contains four clear classes: Q3, Q4, Q5, and Q6. Different strategies have been used today for this scenario.

Instead of presenting another open-ended voice prompt, dialogue and grammar disambiguation module 442 presents the user with a directed voice prompt leading to a maximum reduction of expected entropy of the vague classes. To achieve maximum reduction in clear target classes, the semantic tokens from all clear target classes that the vague class is associated with are collected. One or two semantic token sequences having a maximum length that separates the clear target classes into several subspaces with similar sizes are chosen as features to create the directed voice prompt.

In one illustrative embodiment, and continuing with the example presented above, for the vague class "password," the semantic tokens "password reset" can distinguish Q3, Q4, Q5 and Q6 into a first subspace of Q3 and Q4, and a second subspace of Q5 and Q6. Dialogue and grammar disambiguation module 442 can generate voice prompt 444 incorporating the semantic tokens "password reset" to distinguish Q3, Q4, Q5 and Q6 into subspaces.

Figure 5:
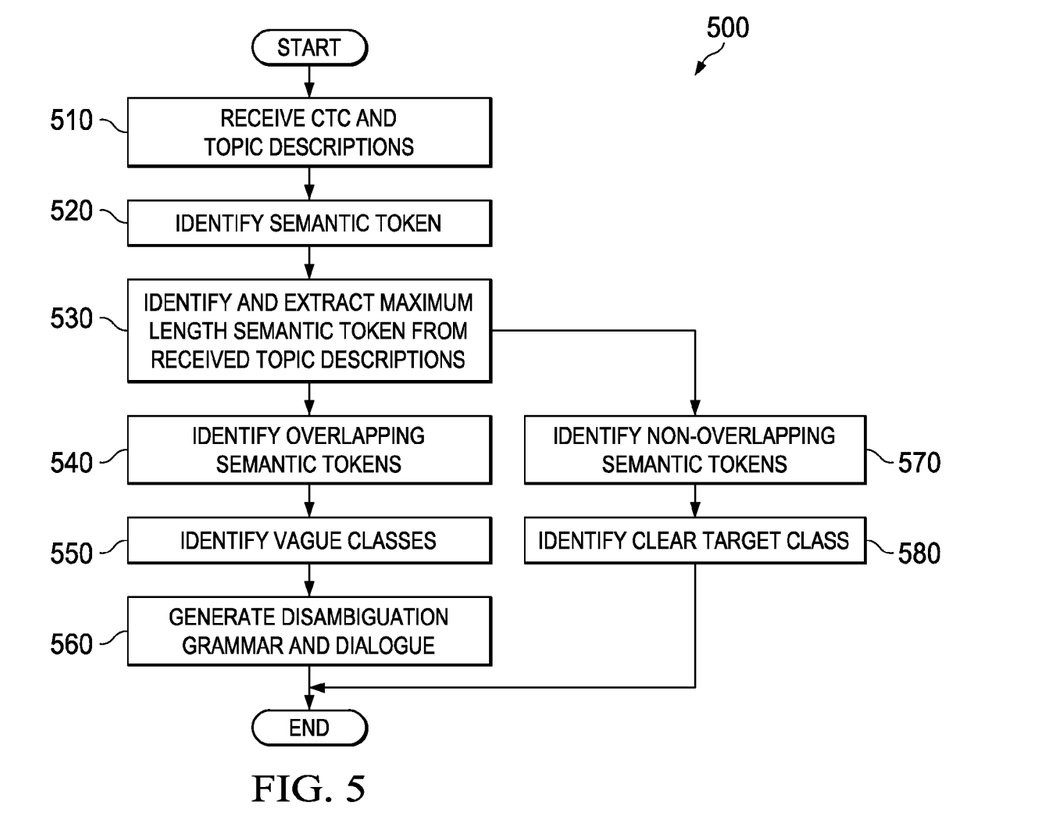
FIG. 5 is a flowchart for establishing a topic classification model according to an illustrative embodiment.

Referring now to FIG. 5, a flowchart for establishing a topic classification model is shown according to an illustrative embodiment. Process 500 uses a software process, executing on a software component, such as maximum length semantic token algorithm 316 and natural language understanding module 320 of FIG. 3.

Process 500 begins by receiving a list of initial target classes and corresponding topic descriptions (step 510). The initial target classes can be initial target classes 310 of FIG. 3. The topic descriptions can be topic descriptions 312 of FIG. 3. The initial target classes can be clear target classes, or vague classes. Clear target classes are typically the terminal nodes of a tree describing the menu options of the interactive voice response system. The initial target classes are commonly given by business requirements. Each clear target class corresponds to a final destination for routing a call within a call center. Topic descriptions briefly describe the semantic meaning of each target class in the natural language call routing application. Topic descriptions are generally one or two sentences describing the scope of the class. Topic descriptions generally describe the business objective of the target classes. Topic description for one clear target may semantically overlap with topic descriptions for other clear target classes.

Process 500 then identifies semantic tokens (step 520). A semantic token is a key word or phrase that is important to the definition of one of clear target classes.

Responsive to extracting semantic tokens, process 500 identifies and extracts maximum length semantic tokens from each of the received topic descriptions (step 530). A semantic token is a key word or phrase that is important to the definition of one of clear target classes. Maximum length semantic token algorithm can identify and extract the semantic tokens by different approaches, such as, but not limited to, a text processor that performs word stemming, combines words into phrases, and removes the filler or function words.

Responsive to identifying and extracting maximum length semantic tokens from each of the received topic descriptions, process 500 identifies overlapping semantic tokens (step 540). Overlapping semantic tokens are semantic tokens appearing in the definition of multiple clear target classes. Overlapping semantic tokens can be overlapping semantic tokens 318 of FIG. 3.

Responsive to identifying overlapping semantic tokens, process 500 uses the overlapping semantic tokens to identify vague classes (step 550). Vague target classes are artificial classes from overlap of clear targets in semantic space. Vague target classes can be vague classes 322-326 of FIG. 3. Overlapping semantic tokens are organized into a data structure containing the vague classes and the underlying clear target classes that are members of the various vague classes. When converted speech input is input into a natural language understanding module, the natural language understanding module can determine whether to perform a disambiguation between various members of the vague class, or whether to route the call according to an identified clear target class.

Responsive to identifying vague classes, process 500 generates disambiguation dialogue and grammar prompts (step 560), with the process terminating thereafter. Maximum length signature semantic tokens are used to generate disambiguation prompts. The term "signature" refers to non-overlapping semantic tokens extracted from topic descriptions that uniquely identify one of clear target classes.

Returning now to step 530, responsive to identifying maximum length semantic tokens, process 500 identifies non-overlapping semantic tokens (step 570). Non-overlapping semantic tokens are semantic tokens appearing in the definition of only one clear target class. Non-overlapping semantic tokens can be used to distinguish among clear target classes within a single vague class.

Responsive to identifying non-overlapping semantic tokens, process 500 then identifies clear target classes (step 580), with the process terminating thereafter. Clear target classes are typically the terminal nodes of a tree describing the menu options of the interactive voice response system. The clear target classes are commonly given by business requirements. Each clear target class corresponds to a final destination for routing a call within a call center.

Figure 6:
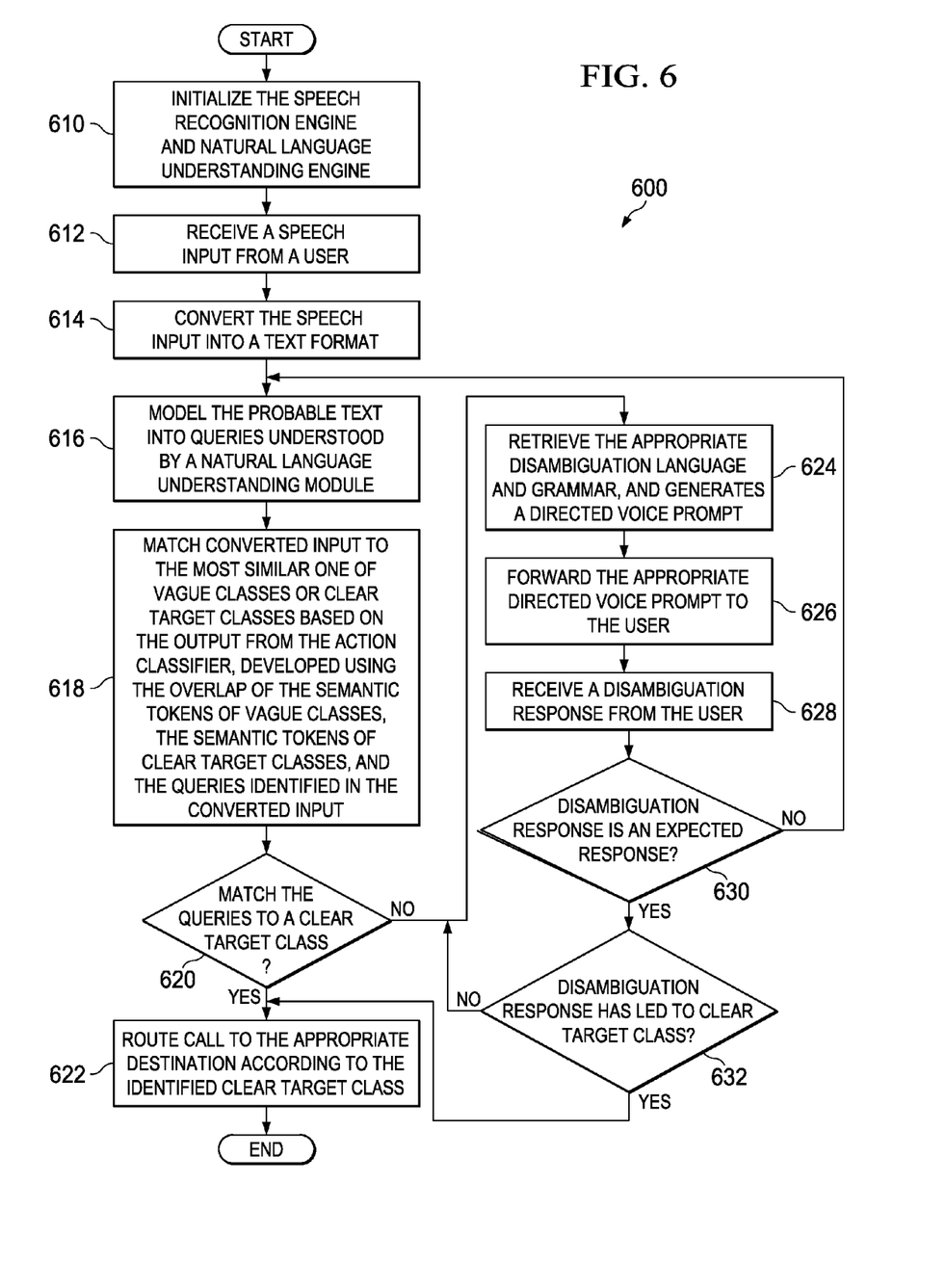
FIG. 6 is a flowchart for routing a call through a natural language call routing interactive voice response according to an illustrative embodiment.

Referring now to FIG. 6, a flowchart for routing a call through a natural language call routing interactive voice response is shown according to an illustrative embodiment. Process 600 is a software process executing on a software component, such as natural language understanding module 330, and automatic speech recognition module 410 of FIG. 4.

Process 600 begins by loading a language model, an action classifier model, and initializing the speech recognition engine and natural language understanding engine (step 610). The language model can be language model 414 of FIG. 4. The action classifier model can be action classifier model in 421 of FIG. 4. This is the initialization of the system, wherein the language model and action classifier model is preloaded into the call routing system.

Process 600 receives a speech input from a user (step 612). The speech input can be speech input 412 of FIG. 4. The speech input is command spoken by a user that attempts to identify or clarify an issue that the user wishes to resolve.

Responsive to receiving the speech input, process 600 converts the speech input into a text format (step 614). A statistical comparison of the speech input to a statistical database is performed in order to determine the probable text conversion. In one illustrative embodiment, speech input is typically divided into frames, and each frame undergoes a short-time Fourier transformation, or other digital transformation, to create a spectral representation of the speech input. Characteristics of the transformed speech input are isolated from each of the signal frames, and compared to statistical models of known subject matter and performers to determine similarities using known statistical classification methods, such as K-nearest neighbor, Gaussian mixture modeling, support vector machines, vector quantization, hidden Markov modeling, and multivariate auto-regression modeling. From those models, a probable text can be determined.

Responsive to converting the speech input to a text format, process 600 models the probable text into queries understood by a natural language understanding module (step 616). The natural language understanding module is natural language understanding module 320 of FIG. 3. The queries are input into natural language understanding module as converted input.

Responsive to modeling the probable text into queries understood by a natural language understanding module, process 600 matches converted input to the most similar one of vague classes or clear target classes based on the output from the action classifier developed using the overlap of the semantic tokens of vague classes, the semantic tokens of clear target classes, and the queries identified in the converted input (step 618).

Responsive to matching the queries to a clear target class ("yes" at step 620), process 600 routes the call to the appropriate destination according to the identified clear target class (step 622), with the process terminating thereafter.

If a match is not made to a clear target class, but rather to a vague class ("no" at step 620), process 600 retrieves the appropriate disambiguation grammar, and generates a directed voice prompt (step 624). The directed voice prompt is designed to lead to a maximum reduction of expected entropy of the vague classes. To achieve maximum reduction in clear target classes, the semantic tokens from all clear target classes that the vague class is associated with, are collected. One or two semantic token sequences having a maximum length that separates the clear target classes into several subspaces with similar sizes are chosen as features to create the directed voice prompt.

Responsive to generating the directed voice prompt, process 600 forwards the appropriate directed voice prompt to the user (step 626). The directed voice prompt is designed to present the user with a few choices leading to a maximum reduction of expected entropy of the vague classes. One or two semantic token sequences having a maximum length that separates the clear target classes into several subspaces with similar sizes can be chosen as feature to create the directed voice prompt.

Process 600 then receives a disambiguation response from the user (step 628). In most cases, the disambiguation response will be one of the few choices corresponding to the disambiguation grammar presented to the user in the directed voice prompt. That is, the response is an expected response. However, in other cases, the user may change their mind regarding the ultimate call routing. In such a case, the disambiguation response from the user does not correspond to one of the directed voice prompts. For example, the user may state, "No, I didn't mean X, I really meant Y." If the disambiguation response from the user does not correspond to one disambiguation grammar presented to the user in the directed voice prompt, the response is an unexpected response.

The system therefore determines whether the disambiguation response is an expected response, or an unexpected response (step 630). Responsive to determining that the disambiguation response is an unexpected response ("no" at step 630), process 600 iterates back to step 616 for determining the possible targets associated with user's input. The process will continue until a clear target class is determined, and the call is routed to its appropriate destination.

Returning now to step 630, responsive to determining that the disambiguation response is an expected response ("yes" at step 630), process 600 determines whether the disambiguation response has led to a clear target class, or whether further disambiguation is required (step 632). Responsive to determining that the disambiguation response has not led to a clear target class ("no" at step 632), process 600 iterates back to step 624 to retrieve the appropriate disambiguation grammar, and generates a directed voice prompt. The directed voice prompt is designed to lead to maximum reduction of expected entropy of the vague classes. To achieve maximum reduction in clear target classes, the semantic tokens from all clear target classes that the vague class is associated with are collected. One or two semantic token sequences having a maximum length that separates the clear target classes into several subspaces with similar sizes are chosen as features to create the directed voice prompt.

Returning now to step 632, responsive to determining that the disambiguation response has led to a clear target class ("yes" at step 632), process 600 routes the call to the appropriate destination according to the identified clear target class (step 622). The process terminates thereafter.

Thus, the illustrative embodiments provide a call routing system that is created by receiving a set of initial target classes and a corresponding set of topic descriptions. Non-overlapping semantic tokens of topic descriptions are identified. A set of clear target classes from the non-overlapping semantic tokens and the initial target classes is identified. Overlapping semantic tokens from the set of topic descriptions are identified. A set of vague classes is identified from the overlapping semantic tokens and the initial target classes. A set of disambiguation dialogues and a set of grammar prompts is generated according to the non-overlapping semantic tokens. The call routing system is then created based on the set of clear target classes, the set of vague target classes, and the set of disambiguation dialogues.

In an illustrative embodiment described herein, clear target classes along with corresponding topic descriptions are analyzed by a maximum length semantic token algorithm. Topic descriptions briefly describe the meaning of each of the clear target classes in the natural language call routing application. A clear target class is the destination of a phone call. Overlapping maximum length semantic tokens within the topic descriptions are pre-processed to determine vague classes. An initial topic classification model is built according to the determined vague classes and the clear target classes. The topic classification model is then used in conjunction with user voice commands to route phone calls of a user according to the user's desired clear target class.

The topic classification model is a summarization of all the information produced from the topic descriptions. The topic classification model is embodied in data that describes the relationship between the semantic meaning of a user statement during a phone call and the corresponding destination for the phone call. An initial topic classification model is the first topic classification model created for a natural language call routing application, which may be modified and refined over time based on additional data from other sources. The performance of this initial topic classification model is very compatible with the performance of the Wizard of OZ system.

In an illustrative embodiment described herein, initial target classes along with corresponding topic descriptions are analyzed by a maximum length semantic token algorithm. Topic descriptions briefly describe the meaning of each of the target classes in the natural language call routing application. A clear target class is the destination of a phone call. Non-overlapping semantic tokens within the topic descriptions are pre-processed to determine first pass disambiguation grammar and dialogue useful for distinguishing clear target classes within a vague class. Disambiguation grammar and disambiguation dialogue is built according to the determined non-overlapping semantic tokens of the topic descriptions. Disambiguation grammar and disambiguation dialogue are then used to distinguish clear target classes within a vague class in conjunction with user voice commands to route phone calls of a user according to the user's desired clear target class.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a call routing system, the computer implemented method comprising:
    receiving a set of initial target classes and a corresponding set of topic descriptions;
    identifying non-overlapping semantic tokens from the set of topic descriptions;
    identifying a set of clear target classes from the non-overlapping semantic tokens and the set of initial target classes;
    identifying overlapping semantic tokens from the set of topic descriptions;
    identifying a set of vague classes from the overlapping semantic tokens and the initial target classes;
    generating a set of disambiguation dialogues and a set of grammar prompts according to the non-overlapping semantic tokens; and
    creating the call routing system based on the set of clear target classes, the set of vague target classes, and the set of disambiguation dialogues.

2. The computer implemented method of claim 1, further comprising:
    identifying the non-overlapping semantic tokens, wherein the non-overlapping semantic tokens are semantic tokens appearing in only one of the set of topic descriptions; and identifying the overlapping semantic tokens from the set of topic descriptions, wherein the overlapping semantic tokens are semantic tokens appearing in a plurality of the set of topic descriptions;

identifying the set of vague classes from the overlapping semantic tokens and the set of initial target classes, wherein each of the set of vague classes corresponds to a plurality of the set of clear target classes; and generating the set of disambiguation dialogues and the set of grammar prompts according to the non-overlapping semantic tokens, wherein the disambiguation dialogues is generated from the non-overlapping semantic tokens to distinguish among ones of the plurality of the set of clear target classes.

3. The computer implemented method of claim 1, the computer implemented method further comprising:

identifying the overlapping semantic tokens from the set of topic descriptions, wherein the overlapping semantic tokens are maximum length semantic tokens.

4. The computer implemented method of claim 1, wherein the step of generating the set of disambiguation dialogues and the set of grammar prompts according to the non-overlapping semantic tokens further comprises:

generating a summary that summarizes a user intent from a preceding query, wherein the summary is generated from the overlapping semantic tokens of a particular vague class of the set of vague classes; and generating a proposed solution that enumerates possible solutions, wherein the possible solutions correspond to ones of the plurality of clear target classes for the particular vague class, and wherein the proposed solution is generated from the non-overlapping semantic tokens of the ones of the plurality of clear target classes for the particular vague class.

5. The computer implemented method of claim 1, further comprising:

identifying a set of clear target classes from the non-overlapping semantic tokens and the set of initial target classes, wherein each of the set of clear target classes corresponds to a final destination for routing a call within the call routing system, and wherein each of the set of clear target classes is a terminal node of a tree describing menu options of the call routing system.

6. The computer implemented method of claim 1 further comprising:

creating the call routing system based on the set of clear target classes, the set of vague classes, and the set of disambiguation dialogues, wherein the call routing system is an initial topic classification model.

7. A computer implemented method for routing a call through a call routing system, comprising:

receiving a spoken speech input from a user;

converting the spoken speech input into a converted input;

classifying the converted input into one of a set of clear target classes or one of a set of vague classes, wherein each of the set of vague classes comprises a plurality of the set of clear target classes, wherein each of the set of vague classes is an overlap of the plurality of clear targets classes in semantic space;

responsive to classifying the converted input as one of the set of vague classes, presenting a set of disambiguation dialogues and a set of grammar prompts to differentiate one of the plurality of clear target classes from the plurality of clear targets classes in semantic space; and responsive to classifying the converted input as one of the set of clear target classes, routing the call to a destination within the call routing system.

8. The computer implemented method of claim 7, further comprising:

converting the spoken speech input into the converted input, wherein the spoken speech is converted into the converted input using a statistically based classification scheme selected from the group consisting of K-nearest neighbor, Gaussian mixture modeling, support vector machines, vector quantization, hidden Markov modeling, and multivariate auto-regression modeling.

9. The computer implemented method of claim 7, further comprising:

classifying the converted input into one of the set of clear target classes or one of a set of vague classes, wherein the set of clear target classes correspond to the non-overlapping semantic tokens identified from a set of topic descriptions, and wherein the set of vague classes correspond to overlapping semantic tokens identified from the set of topic descriptions, wherein each of the set of vague classes corresponds to a plurality of the clear target classes.

10. The computer implemented method of claim 7, wherein the step of presenting the set of disambiguation dialogues and the set of grammar prompts comprises:

presenting a summary that summarizes a user intent from a preceding query, wherein the summary is generated from overlapping semantic tokens of a particular vague class of the set of vague classes; and presenting a proposed solution that enumerates possible solutions, wherein the possible solutions correspond to ones of the plurality of clear target classes for the particular vague target class, and wherein the proposed solution is generated from non-overlapping semantic tokens of the ones of the plurality of clear target classes for the particular vague target class.

11. The computer implemented method of claim 7, further comprising:

responsive to presenting the set of disambiguation dialogues and the set of grammar prompts, receiving a second spoken speech input from the user;

converting the second spoken speech input into a second converted input;

responsive to classifying the second converted input as one of the set of vague classes, presenting a second set of disambiguation dialogues and a second set of grammar prompts; and responsive to classifying the second converted input as one of the set of clear target classes, routing the call to the destination within the call routing system.

12. The computer implemented method of claim 11, wherein the step of presenting the second set of disambiguation dialogues and the second set of grammar prompts further comprises:

responsive to classifying the second converted input as one of the set of vague classes, presenting the second set of disambiguation dialogues and the second set of grammar prompts, wherein the second set of disambiguation dialogues and the second set of grammar prompts leads to a maximum reduction of expected entropy of the set of vague classes.

13. A tangible computer storage type medium having a computer program product encoded thereon for creating a call routing system, the computer program product comprising:

computer usable instructions for receiving a set of initial target classes and a corresponding set of topic descriptions;

computer usable instructions for identifying non-overlapping semantic tokens from the set of topic descriptions;

computer usable instructions for identifying a set of clear target classes from the non-overlapping semantic tokens and the initial target classes;

computer usable instructions for identifying overlapping semantic tokens from the set of topic descriptions;

computer usable instructions for identifying a set of vague classes from the overlapping semantic tokens and the initial target classes;

computer usable instructions for generating a set of disambiguation dialogues and a set of grammar prompts according to the non-overlapping semantic tokens; and computer usable instructions for creating the call routing system based on the set of clear target classes, the set of vague target classes, and the set of disambiguation dialogues.

14. The tangible computer storage type medium of claim 13, the computer program product further comprising:
computer usable instructions for identifying non-overlapping semantic tokens, wherein the non-overlapping semantic tokens are semantic tokens appearing in only one of the set of topic descriptions; and
computer usable instructions for identifying overlapping semantic tokens from the set of topic descriptions, wherein the overlapping semantic tokens are semantic tokens appearing in a plurality of the set of topic descriptions;
computer usable instructions for identifying a set of vague classes from the overlapping semantic tokens and the initial target classes, wherein the each of the set of vague classes corresponds to a plurality of the clear target classes; and
computer usable instructions for generating a set of disambiguation dialogues and a set of grammar prompts according to the non-overlapping semantic tokens, wherein the disambiguation dialogues is generated from the non-overlapping semantic tokens to distinguish among clear target classes of ones of the plurality of clear target classes.

15. The tangible computer storage type medium of claim 13, the computer program product further comprising:
computer usable instructions for identifying overlapping semantic tokens from the set of topic descriptions, wherein the overlapping semantic tokens are maximum length semantic tokens.

16. The tangible computer storage type medium of claim 13, wherein the computer usable instructions for generating the set of disambiguation dialogues and the set of grammar prompts according to the non-overlapping semantic tokens further comprises:
computer usable instructions for generating a summary that summarizes a user intent from a preceding query, wherein the summary is generated from the overlapping semantic tokens of a particular vague class of the set of vague classes; and
computer usable instructions for generating a proposed solution that enumerates possible solutions, wherein the possible solutions correspond to ones of the plurality of clear target classes for the particular vague target class, and wherein the proposed solution is generated from the non-overlapping semantic tokens of the ones of the plurality of clear target classes for the particular vague target class.

17. The tangible computer storage type medium of claim 13, the computer program product further comprising:
computer usable instructions for identifying a set of clear target classes from the non-overlapping semantic tokens and the initial target classes, wherein each of the set of clear target classes corresponds to a final destination for routing a call within the call routing system, and wherein each of the set of clear target classes is a terminal node of a tree describing menu options of the call routing system.

18. The tangible computer storage type medium of claim 13, the computer program product further comprising:
computer usable instructions for creating the call routing system based on the set of clear target classes, the set of vague target classes, and the set of disambiguation dialogues, wherein the call routing system is an initial topic classification model.

19. A data processing system comprising:
a bus;
a storage connected to the bus, the storage having a computer program product encoded thereon for creating a call routing system; and
a processor connected to the bus, wherein the processor executes the computer program product to receive a set of initial target classes and a corresponding set of topic descriptions; to identify non-overlapping semantic tokens the set of topic descriptions; to identify a set of clear target classes from the non-overlapping semantic tokens and the initial target classes; to identify overlapping semantic tokens from the set of topic descriptions; to identify a set of vague classes from the overlapping semantic tokens and the initial target classes; to generate a set of disambiguation dialogues and a set of grammar prompts according to the non-overlapping semantic tokens; and to create the call routing system based on the set of clear target classes, the set of vague target classes, and the set of disambiguation dialogues.

20. The data processing system of claim 19, wherein the processor further executes the computer program product:
to identify non-overlapping semantic tokens, wherein the non-overlapping semantic tokens are semantic tokens appearing in only one of the set of topic descriptions; to identify overlapping semantic tokens from the set of topic descriptions, wherein the overlapping semantic tokens are semantic tokens appearing in a plurality of the set of topic descriptions; to identify a set of vague classes from the overlapping semantic tokens and the initial target classes, wherein each of the set of vague classes corresponds to a plurality of the clear target classes; and to generate a set of disambiguation dialogues and a set of grammar prompts according to the non-overlapping semantic tokens, wherein the disambiguation dialogues is generated from the non-overlapping semantic tokens to distinguish among the clear target classes of ones of the plurality of clear target classes.

21. The data processing system of claim 19, wherein the processor further executes the computer program product:
to identify overlapping semantic tokens from the set of topic descriptions, wherein the overlapping semantic tokens are maximum length semantic tokens.

22. The data processing system of claim 19, wherein the processor executing the computer program product to generate a set of disambiguation dialogues and a set of grammar prompts according to the non-overlapping semantic tokens further comprises the processor executing the computer program product:
to generate a summary that summarizes a user intent from a preceding query, wherein the summary is generated from the overlapping semantic tokens of a particular vague class of the set of vague classes; and
to generate a proposed solution that enumerates possible solutions, wherein the possible solutions correspond to ones of the plurality of clear target classes for the particular vague target class, and wherein the proposed solution is generated from the non-overlapping semantic tokens of the ones of the plurality of clear target classes for the particular vague target class.

23. The data processing system of claim 19, wherein the processor further executes the computer program product:
to identify a set of clear target classes from the non-overlapping semantic tokens and the initial target classes, wherein each of the set of clear target classes corresponds to a final destination for routing a call within the call routing system, and wherein each of the set of clear target classes is a terminal node of a tree describing menu options of the call routing system.

24. The data processing system of claim 19, wherein the processor further executes the computer program product:
to create the call routing system based on the set of clear target classes, the set of vague target classes, and the set of disambiguation dialogues, wherein the call routing system is an initial topic classification model.

* * * * *